United States Patent [19]

Kempter et al.

[11] 4,310,646

[45] Jan. 12, 1982

[54] SELF-CROSSLINKING CATIONIC BINDERS AND THEIR PREPARATION

[75] Inventors: Fritz E. Kempter, Mannheim; Eberhard Schupp, Schwetzingen, both of Fed. Rep. of Germany

[73] Assignee: BASF Aktiengesellschaft, Fed. Rep. of Germany

[21] Appl. No.: 138,010

[22] Filed: Apr. 7, 1980

[30] Foreign Application Priority Data

Apr. 9, 1979 [DE] Fed. Rep. of Germany ....... 2914331
Mar. 7, 1980 [DE] Fed. Rep. of Germany ....... 3008810

[51] Int. Cl.$^3$ ..................... C08G 18/80; C08G 18/58; C25D 13/06; C08L 73/00

[52] U.S. Cl. ............................ 525/528; 204/181 C; 260/18 TN; 260/29.2 TN; 525/452; 525/454; 525/455; 525/456; 528/45

[58] Field of Search ............... 525/452, 455, 454, 456, 525/528; 260/29.2 TN, 18 TN; 528/45; 204/181 C

[56] References Cited

U.S. PATENT DOCUMENTS

| | | | |
|---|---|---|---|
| 3,312,664 | 4/1967 | Bremmer | 260/47 |
| 3,391,097 | 7/1968 | Williamson | 260/18 |
| 3,450,711 | 6/1969 | Megna et al. | 260/326 |
| 3,922,253 | 11/1975 | Jerabek et al. | 260/77.5 TB |
| 3,947,339 | 3/1976 | Jerabek et al. | 204/181 |
| 3,979,365 | 9/1976 | Tanaka et al. | 525/542 |
| 3,984,299 | 10/1976 | Jerabek | 204/181 |
| 4,036,800 | 7/1977 | Sekmakas et al. | 525/452 |
| 4,134,865 | 1/1979 | Tominaga | 525/528 |
| 4,260,727 | 4/1981 | Floyd | 528/45 |

FOREIGN PATENT DOCUMENTS

| | | |
|---|---|---|
| 1221906 | 2/1971 | United Kingdom . |
| 1409728 | 10/1975 | United Kingdom . |
| 1469068 | 3/1977 | United Kingdom . |
| 1501274 | 2/1978 | United Kingdom . |
| 1538970 | 1/1979 | United Kingdom . |
| 1540179 | 2/1979 | United Kingdom . |

Primary Examiner—H. S. Cockeram
Attorney, Agent, or Firm—Keil & Witherspoon

[57] ABSTRACT

The binders are reaction products of (A) adducts of ammonia or diamines and epoxide compounds with (B) partially or fully blocked diisocyanates or polyisocyanates, with or without (C) diamines or polyamines, the amino-$\beta$-hydroxyalkyl groups of component (A) preferably having been reacted—prior to their reaction with component (B)—with a carbonyl compound, preferably an aldehyde, to form an oxazolidine ring. The reaction products are ultimately protonized with an acid.

These binders are used for the cathodic electrocoating of metallically conductive articles.

39 Claims, No Drawings

SELF-CROSSLINKING CATIONIC BINDERS AND THEIR PREPARATION

The present invention relates to self-crosslinking cationic binders based on adducts of ammonia and epoxide compounds, a process for their preparation, and their use for the preparation of coating agents which can be diluted with water, and in particular their use, in a protonized form, as binders for the cathodic electrocoating of metallic articles.

Surface-coating agents for cathodic electrocoating, based on reaction products of epoxide compounds with primary and/or secondary amines, have long been known and are employed, after having been subjected to very diverse modification processes, for the production of cathodic electrocoating finishes.

In contrast to the reaction of epoxide compounds with primary or secondary amines, the reaction with ammonia has hitherto not been disclosed in the context of electrocoating binders.

Regarding the reaction between polyepoxides and ammonia per se, there is also very little information in the literature.

German Laid-Open Application DOS No. 1,495,537, for example, describes the reaction of epoxide compounds with ammonia in the presence of emulsifiers and/or protective colloids.

Japanese Pat. No. 026,341 concerns the reaction of diepoxide compounds with aqueous ammonia in acetone solution, to give 1,4-bis-(2-hydroxy-3-aminopropoxy)-benzene, of melting point 128°–132° C.

Di-primary amino compounds, of the following formula

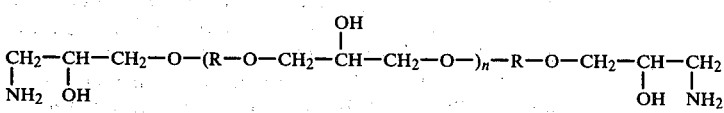

can be obtained by the method of U.S. Pat. No. 1,947,879.

According to this Patent, the products are intended to be used together with diglycidyl esters of dicarboxylic acids as epoxide curing agents.

These products are described as compounds which contain exclusively primary amino groups.

Such products are obtained if the reaction of diepoxides is carried out with a large excess of ammonia. For example, U.S. Pat. No. 1,947,879, referred to above, mentions an excess of from 25 to 50 moles of ammonia per epoxide group.

U.S. Pat. No. 3,716,402 describes reaction products of epoxy resins with primary amines. It is true that ammonia is also mentioned as a primary amine, but this Patent prescribes the use of 1 equivalent of epoxide per mole of amine, leading to crosslinking of the batch if ammonia is used as the amine.

Cationic electrocoating binders which contain self-crosslinking resins with blocked isocyanate groups and amino or hydroxyl groups have been described, for example, in German Published Applications DAS No. 2,252,536 and in German Laid-Open Applications DOS No. 2,265,195, DOS No. 2,603,666, DOS No. 2,541,234, DOS No. 2,733,188 and DOS No. 2,715,259.

It is an object of the present invention to provide novel nitrogen-containing adducts and an advantageous process for the preparation of binders for cathodic electrocoating finishes. A particularly important aim of this process is to provide nitrogen-containing adducts which do not possess the disadvantages entailed in removing excess di- or poly-amines when these compounds are reacted with diepoxide compounds to give products of the following structure:

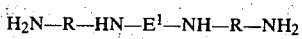

It is a further object of the present invention to provide self-crosslinking cationic binders and an advantageous process for their preparation, which leaves the primary and/or secondary amino-β-hydroxyalkyl groups of polymeric derivatives of epoxy compounds unaffected in respect of their function as basic and reactive groups in the reaction with semi-blocked or partially blocked diisocyanates or polyisocyanates, i.e. in respect of their function as groups which are accessible to crosslinking reaction with the blocked isocyanate groups, and thus, in particular, improves the rate of curing of the coating compositions.

We have found, surprisingly, that this object is achieved by reacting diepoxide or polyepoxide compounds with relatively small amounts of ammonia, and that this reaction gives nitrogen-containing oligomers or polymers of low molecular weight, which can be employed particularly advantageously as starting materials for the preparation of cathodic coating binders.

We have found, further, that the reaction of the primary and/or secondary amino-β-hydroxyalkyl groups of polymeric derivatives of epoxide compounds with carbonyl compounds, to give the corresponding oxazolidines, ensures the desired protection of the basic amino groups prior to the reaction with semi-blocked or partially blocked diisocyanates or polyisocyanates, and that this protective action can also be extended to the NH-oxazolidines formed from primary amino-β-hydroxyalkyl groups, such NH-oxazolidines being per se capable of reaction with isocyanates, if these NH groups are first converted, by means of epoxide compounds, into N-hydroxy-alkyloxazolidines and, after the reaction with semi-blocked or partially blocked diisocyanates or polyisocyanates, the oxazolidine groups of the self-crosslinking binders are cleaved by hydrolysis after protonization. The carbonyl compounds split off, and any other solvents which may be present, can then be removed from the aqueous dispersion of the binder. By means of the process used to prepare the novel binders, it proves possible to protect the amino groups of polymeric derivatives of epoxide compounds, carrying primary and/or secondary amino-β-hydroxyalkyl groups, prior to the reaction of these derivatives with isocyanates, and to retain the possibility of a subsequent crosslinking reaction with blocked isocyanate groups.

Coating agents containing oxazolidine groups are disclosed, for example, in U.S. Pat. Nos. 3,743,626 and 3,661,923 and in German Laid-Open Applications DOS No. 2,446,438, DOS No. 1,952,091, DOS No. 1,952,092, DOS No. 2,018,233, DOS No. 2,446,438 and DOS No. 2,458,588, which describe moisture-curing systems based on crosslinking with isocyanates. German Laid- Open Application DOS No. 2,732,131 discloses a chain-extending reaction on the principle of the reaction of systems containing isocyanate groups and oxazolidine groups with water.

German Published Application DAS No. 1,444,407 describes curable, water-soluble reaction products of epoxide groups with, for example, ethylenediamine, which, after protonization, are reacted further with aqueous formaldehyde. Under these conditions, oxazolidine formation is not possible. Evidently, the amino groups which are not accessible to the reaction according to the invention are to be reacted in some other way. However, none of these publications provides any indication of the preparation of cathodic electrocoating binders.

The present invention relates to self-crosslinking cationic binders for the cathodic electrocoating of metallically conductive articles, wherein the binders have been obtained by reacting (A) adducts of ammonia and epoxide compounds of the general formulae

(I)

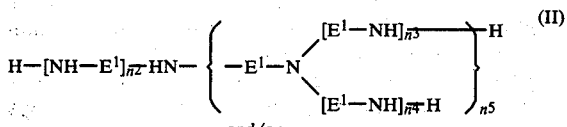

(II)

and/or

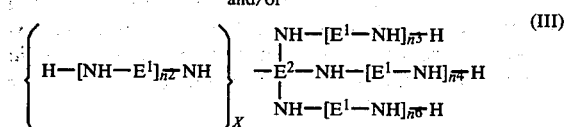

(III)

where R is S-alkyl of 1 to 12 carbon atoms, or phenoxy or alkylphenoxy where alkyl is of 1 to 18 carbon atoms, the $E^1$'s are identical or different hydroxyl-containing divalent radicals and the $E^2$'s are identical or different hydroxyl-containing trivalent or tetravalent radicals, resulting from the opening of the oxirane rings of epoxide compounds containing two, three or four epoxide groups in the molecule, $n^1$ is from 1 to 5, $n^2$, $n^3$, $n^4$ and $n^6$ are from 0 to 3 and $n^5$ is from 1 to 3, with (B) partially or completely blocked diisocyanates or polyisocyanates, with or without (C) diamines or polyamines and subsequently protonizing the reaction product with an acid.

The present invention also relates to the above self-crosslinking binders in which some of the primary and/or secondary amino groups, prior to the reaction with the blocked polyisocyanates, have been converted to amide groups by reaction with saturated or ethylenically unsaturated carboxylic acids or carboxylic acid esters where acyl is of 6 to 24 carbon atoms, or have been reacted with monoglycidyl ethers of saturated or olefinically unsaturated alkylphenols where alkyl is of 6 to 18 carbon atoms, or monoglycidyl esters of saturated or olefinically unsaturated carboxylic acids where acyl is of 6 to 24 carbon atoms, or have been converted to ketimine or oxazolidine groups.

The present invention furthermore relates to the above self-crosslinking binders in which all of the primary and/or secondary amino groups have been converted to urea groupings by reaction with partially or completely blocked diisocyanates or polyisocyanates.

The present invention further relates to self-crosslinking cationic binders for the cationic electrocoating of metallically conductive articles, which binders have been obtained by reaction of (A) derivatives of epoxide compounds, which contain primary and/or secondary amino-$\beta$-hydroxyalkyl groups and have molecular weights of from 300 to 5,000, with (B) semi-blocked or partially blocked diisocyanates or polyisocyanates, with or without (C) diamines or polyamines and protonization of the reaction product with an acid, wherein the primary and/or secondary amino-$\beta$-hydroxyalkyl groups of component (A) have, prior to the reaction with component (B), been reacted, to form an oxazolidine ring, with a carbonyl compound of the general formula (IV)

(IV)

where $R^1$ and $R^2$ may be identical or different and each is hydrogen, an aliphatic hydrocarbon radical of 1 to 4 carbon atoms, a cycloaliphatic hydrocarbon radical of 5 to 7 carbon atoms or an aromatic hydrocarbon radical of 6 to 10 carbon atoms or $R^1$ and $R^2$, conjointly with the carbon atom of the carbonyl group, are linked to form a 5-membered or 6-membered cycloaliphatic hydrocarbon ring.

The present invention further relates to self-crosslinking cationic binders in which some of the primary and/or secondary amino-$\beta$-hydroxyalkyl groups of component (A) have, before reaction with the carbonyl compound (IV), been converted to the corresponding amides by reaction with saturated or ethylenically unsaturated fatty acids or dimeric fatty acids, as well as to those binders in which the NH group of the oxazolidine ring, resulting from the reaction or primary amino-$\beta$-hydroxyalkyl groups of component (A) with the carbonyl compound (IV), has been reacted with an epoxide compound prior to the reaction with component (B).

The present invention further relates to a process for the preparation of the self-crosslinking, cationic binders for the cathodic electrocoating of metallically conductive articles, wherein, after reaction of component (A) with component (B), with or without component (C), the reaction product is protonized with a carboxylic acid, and after addition of water the carbonyl compounds split off on hydrolysis are removed by distillation as an azeotropic mixture with water, which may or may not be mixed with an organic solvent, additional water being added during the distillation, if appropriate.

The following details may be given with regard to the components used for the preparation of the self-crosslinking binders.

Suitable epoxide compounds for the preparation of the adducts to be used according to the invention are those with 2, 3 or 4 epoxide groups per molecule, for example reaction products of polyhydric phenols, especially those of the formula

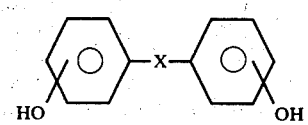

where X is CH₂,

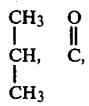

S, SO or SO₂, with epichlorohydrin, and reaction products of other phenols, eg. bis-(4-hydroxy-tert.-butylphenyl)-2,2-propane, bis-(2-hydroxynaphthyl)-methane and 1,5-dihydroxynaphthalene or "dimeric" and phenol adducts of cardanol (for example 3-(pentadeca-8,11-dienyl)-phenol) with epichlorohydrin. However, the reaction products of polyhydric alcohols, eg. ethylene glycol, diethylene glycol, propylene glycols, bis-(4-hydroxycyclohexyl)-2,2-propane, pentaerythritol, dipentaerythritol, trimethylolpropane, hexanetriol, glycerol or sorbitol, with epichlorohydrin may also be used. Other suitable epoxide compounds are epoxidized oligobutadienes or polybutadienes or isoprenes, and also products which contain epoxidized cyclohexene radicals, epoxy resins obtained from 1,1-methylenebis-(5-substituted)-hydantoin by the method of U.S. Pat. No. 3,891,097, diepoxides obtained from bisimides by the method of U.S. Pat. No. 3,450,711, epoxidized aminomethyldiphenyl oxides obtained by the method of U.S. Pat. No. 3,312,664 and 1,3,5-triglycidyl isocyanurate.

Of course, various epoxide compounds, for example those based on bisphenol A and having different epoxide values, can be combined with one another, in order to obtain specific particularly suitable molecular weights and/or amine contents; compounds based on diphenols and polyphenols and aliphatic epoxide compounds may also be used, in order additionally to obtain modified products which have particularly advantageous resilience properties in reaction products (B) and (C).

Examples of suitable monoepoxides are those having a sufficiently high molecular weight, for example derivatives of the above epoxides based on diphenols or polyphenols, which, as is known, can be prepared very easily by reaction with monophenols, monomercaptans and the like. The epoxide compounds are reacted with ammonia in a ratio corresponding to from 1 to 25, preferably from 1.75 to 15 and in particular from 1.75 to 10 moles of ammonia per epoxide group.

The molecular weights of the polyadducts according to the invention are in general from 500 to 5,000, corresponding to amine numbers of from 10 to 275 mg of KOH/g of solids.

If a high or moderate excess of ammonia is used in the preparation of the polyadducts according to the invention, the products obtained contain exclusively primary amino groups, or primary and secondary amino groups, and their structures can be formally described by the general formulae (I) and (II), $n^4$ in formula (II) being 0.

The reaction of ammonia with the epoxide compounds is in general carried out at from 20° to 100° C., preferably at from 50° to 80° C., in pressure reactors, under pressures of from 2 to 25 bar.

Advantageously, the reaction is carried out in the presence of a solvent, eg. an alcohol, glycol ether or ketone, or an aromatic, aliphatic or cycloaliphatic hydrocarbon, or in a mixture of the said solvents. If a higher-boiling solvent is used, this need not be removed after completion of the reaction. Solvents, however, should be so chosen that they do not result in side reactions during working up to remove excess ammonia or have an adverse effect on any subsequent reaction steps.

The molecular weight resulting from the reaction of ammonia with the epoxide compounds depends not only on the ratio of ammonia to epoxide groups but also on the dilution at which the reaction is carried out; with increasing dilution, products of lower molecular weight are obtained.

In general, the reaction is carried out by initially introducing some or all of the solvent together with the ammonia, and feeding in the epoxide compound or compounds, if necessary stepwise and in the form of a solution or in the melt. In order to remove the solvent and excess ammonia, the reaction mixture is subsequently heated at 100°-200° C., where appropriate under reduced pressure.

If, in the preparation of the adducts to be used according to the invention, $E^1$ is in part replaced by triepoxide or tetraepoxide compounds, correspondingly branched products are obtained (cf. $E^2$ in general formula III). Products branched via tertiary nitrogen can be obtained if the amount of ammonia employed is progressively reduced. Their structure can be represented by the general formula (II), where $n^4 > 0$.

The adducts (A) to be used according to the invention may or may not be converted by partial or complete reaction of the primary or secondary amino groups with carboxylic acids or esters of saturated or ethylenically unsaturated carboxylic acids where acyl is of 6 to 24 carbon atoms, to give the corresponding products containing amide groups. Dimeric fatty acids can be employed if this modifying reaction is to result in a quasi-doubling of the molecular weight.

Similar remarks also apply to the reaction with monoepoxide compounds, in which primary amino groups are converted to secondary amino groups and the latter are converted to tertiary amino groups.

It is possible to use monoepoxide compounds in which the alkyl radical is of 2 to 24 carbon atoms, eg. ethylene oxide, propylene oxide, glycidol, butylene oxide and the like. A further specific method of modification is to carry out a reaction with glycidyl ethers of alkylphenols, where alkyl is saturated or ethylenically unsaturated and of 6 to 18 carbon atoms, eg. nonylphenol or cardanol, which can essentially be regarded as 3-(pentadeca-8,11-dienyl)-phenol, or with monoglycidyl esters of saturated or ethylenically unsaturated, linear or branched carboxylic acids, where acyl is of 6 to 24 carbon atoms.

One of the reasons why epoxide/ammonia adducts are particularly preferred is because there are 2 secondary OH groups for each secondary amino group formed, even when starting from epoxide compounds which do not contain any OH groups in the molecule, so that after formation of the oxazolidine ring at least one of these OH groups remains available for reaction with the isocyanate groups of the partially blocked isocyanates. In the case of the corresponding epoxide/diamine adducts it is necessary, in order to ensure the presence of the OH groups required for reaction with isocyanate groups, (a) either to employ epoxide compounds containing OH groups or (b) only partially cyclize the corresponding secondary amino-β-hydroxyalkyl groups to oxazolidine rings.

A reversible reaction of the polyadducts to be used according to the invention comprises converting the primary amino groups to their ketimines using ketones, and then carrying out a reaction with partially or completely blocked diisocyanates or polyisocyanates to give products which, after hydrolysis of the ketimine groups, carry one or more, preferably from 1.75 to 2.5, amino groups per molecule of component (B). Secondary amino groups can be converted to oxazolidines by reaction with aldehydes, eg. formaldehyde or isobutyraldehyde, and thus temporarily protected.

(A) Suitable derivatives of epoxide compounds, which contain primary and/or secondary amino-β-hydroxyalkyl groups and have molecular weights of from 300 to 5,000 are, for example, adducts of ammonia and epoxide compounds, of the general formulae (I), (II) and (III), and adducts of diamines and epoxide compounds, of the general formulae

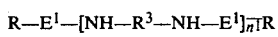

$$R—E^1—[NH—R^3—NH—E^1]_{\overline{n_1}}R \qquad (V)$$

and/or

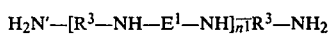

$$H_2N'—[R^3—NH—E^1—NH]_{\overline{n_1}}R^3—NH_2 \qquad (VI)$$

where R is S-alkyl of 1 to 12 carbon atoms, phenoxy or alkylphenoxy, where alkyl is of 1 to 18 carbon atoms, and $R^3$ is a straight-chain, branched or cyclic divalent hydrocarbon radical of 2 to 16 carbon atoms which may or may not contain NH groups or ether groups, the $E^1$'s are identical or different hydroxyl-containing divalent radicals, as are obtained by opening the oxirane rings of epoxide compounds having two epoxide groups in the molecule, and $n_1$ is an integer from 0 to 5.

The primary amino groups (—NH$_2$) of the formula (VI) can also be in the form of ketimine groups

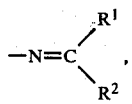

and a proportion of the primary and/or secondary amino-β-hydroxyalkyl groups of the formulae (II) to (VI) can have been modified by appropriate measures, for example an amidation reaction with saturated or ethylenically unsaturated carboxylic acids or their esters, or a reaction with glycidyl ethers of alkylphenols, the alkyl groups being saturated or ethylenically unsaturated, or with monoglycidyl esters.

To introduce the protective groups, the nitrogen-containing polymers are reacted with carbonyl compounds. Furthermore, the NH-oxazolidine groups formed from the terminal primary amino-β-hydroxyalkyl groups ($R^4$=H) may be reacted with epoxide compounds

to give the corresponding N-hydroxy-alkyloxazolidines (VII), as may be seen from the following reaction scheme:

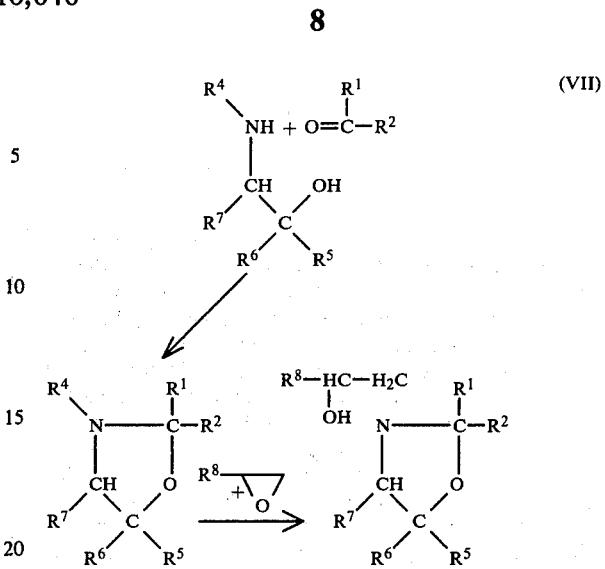

where $R^1$ and $R^2$ are identical or different radicals and each is hydrogen, an aliphatic hydrocarbon radical of 1 to 4 carbon atoms, a cycloaliphatic hydrocarbon radical of 5 to 7 carbon atoms or an aromatic hydrocarbon radical of 6 to 10 carbon atoms, or $R^1$ and $R^2$ are linked to form, together with the carbon atom of the carbonyl group, a 5-membered or 6-membered cycloaliphatic hydrocarbon ring, $R^4$ and $R^5$ may be identical or different and each is hydrogen or the radical, obtained by opening the oxirane ring, of an epoxide compound of 2 to 24 carbon atoms, a glycidyl ether with a saturated or unsaturated alkyl group of 1 to 18 carbon atoms, a monoglycidyl ester of a saturated or ethylenically unsaturated linear or branched carboxylic acid of 1 to 24 carbon atoms in the acyl radical, or a polyfunctional epoxide compound, $R^6$ and $R^7$ are hydrogen or together form a 5-membered or 6-membered cycloaliphatic ring and $R^8$ is hydrogen, an aliphatic branched or unbranched hydrocarbon radical of 1 to 24 carbon atoms, which may or may not be substituted by hydroxyl groups, the radical, bonded to the 1,2-epoxide group, of a glycidyl ether with saturated or ethylenically unsaturated alkyl of 1 to 18 carbon atoms, the radical, bonded to the 1,2-epoxide group, of a monoglycidyl ester of a saturated or ethylenically unsaturated linear or branched carboxylic acid of 1 to 24 carbon atoms in the acyl radical, or the radical, bonded to the 1,2-epoxide group, of a polyfunctional epoxide compound.

Other compounds which may be reacted with the epoxide compounds are diamino compounds which give products of the formula (V) and (VI). Examples of suitable diamines of the general formula H$_2$N—R$^3$—NH$_2$, where R$^3$ has the above meaning, are ethylenediamine, propylenediamine, 1,3-diaminopropane, 3-amino-1-cyclohexylamino-propane, 1,5-diaminopentane, hexamethylenediamine, 1,2-bis-(3-aminopropoxy)-ethane and (2-aminoethyl)-aminopropyl-amine; polyalkylenepolyamines, e.g. diethylenetriamine and dipropylenetriamine; bis-(3-aminopropyl)-methylamine and bis-(6-aminohexyl)-amine; bis-(4-aminocyclohexyl)-methane; bis-(3-methyl-4-aminocyclohexyl)-methane; 2,2-bis-(4-aminocyclohexyl)-propane; (3-methyl-4-aminocyclohexyl)(3-methyl-4-aminophenyl)-methane; 4,4-diaminodiphenylmethane; bis-(4-methylaminophenyl)-methane and bis-(3-methyl-4-aminophenyl)methane.

When using these compounds, it is necessary to ensure that they are also employed in excess over the epoxide compounds. In general, the above conditions are chosen for the reaction; the reactions are usually carried out under atmospheric pressure and the excess amine and/or solvent may be removed, as in the case of the epoxide/ammonia adducts, by distillation, where necessary under reduced pressure at from 100° to 250° C., and in particularly difficult cases even in a thin film evaporator. Here again, the ranges of molecular weights and amine numbers stated in connection with the epoxide/ammonia adducts apply.

The adducts (A) to be used according to the invention may or may not be converted, by partial reaction of the primary and/or secondary amino groups with carboxylic acids or esters of saturated or ethylenically unsaturated carboxylic acids where acyl is of 6 to 24 carbon atoms, to give the corresponding products containing amide groups. Dimeric fatty acids can be employed if this modifying reaction is to result in a quasi-doubling of the molecular weight.

It is to be borne in mind that the epoxide/amine adducts of the above diamines contain, in addition to the secondary amino-$\beta$-hydroxyalkyl groups, primary amino groups and may also, as for example when dialkylenetriamines are used, contain secondary amino groups. The primary amino groups (which do not contain $\beta$-hydroxyalkyl groups) can only be protected in accordance with the invention by means of carbonyl compounds (IV) if they are converted, by means of ketones, to their corresponding ketimines. If this is not the case, they will, during the reaction with the blocked isocyanates, interact with the latter and form urea groups. Similar remarks apply to the primary amino-$\beta$-hydroxyalkyl groups of the epoxide-ammonia adducts. The corresponding oxazolidines can be prepared particularly advantageously by using aldehydes, for example isobutyraldehyde (formula VII). Since the resulting NH-oxazolidines react with blocked isocyanates, the structure, in this form, does not constitute a group which affords protection against isocyanate groups; it is necessary to ensure, by means of an additional reaction, for example with epoxide compounds, eg. the monoepoxide compounds already mentioned above in another context, that the basic group remains preserved and is present, after hydrolysis, in the form of the secondary amino-$\beta$-hydroxyalkyl group.

The reaction of the NH group with the epoxide compound takes place as described in U.S. Pat. No. 3,707,541 and, from our own observations, very probably on the basis of the tautomeric equilibrium.

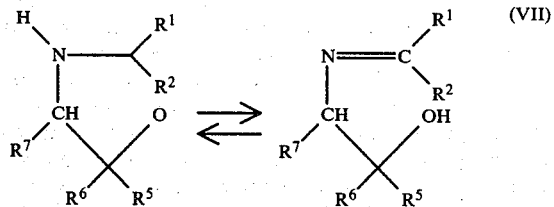

(VII)

In accordance with the less pronounced basicity of the NH-oxazolidines, the reaction is carried out at somewhat higher temperatures than are conventionally used for epoxide-amine reactions, and may also be carried out under slightly superatmospheric pressure. The preferred temperature range is, for example, from 100° to 150° C.

The reaction of component (A) with carbonyl compounds to give the corresponding oxazolidines is carried out by methods disclosed in the literature (E. D. Bergmann, Chem. Rev., 53 (1953), 309) a ketone and/or aldehyde being condensed, with occurrence of cyclizing dehydration, with the polymeric component (A) which contains primary and/or secondary amino-$\beta$-hydroxyalkyl groups and may or may not also contain ketimine groups, and the water of reaction usually being removed azeotropically by an inert entraining agent or by an excess of the carbonyl compound employed.

The following aldehydes and ketones are particularly suitable carbonyl compounds of the general formula (IV)

formaldehyde, acetaldehyde, propionaldehyde, butyraldehyde, isobutyraldehyde, benzaldehyde, tetrahydrobenzaldehyde, acetone, methyl propyl ketone, methyl isopropyl ketone, diethyl ketone, methyl butyl ketone, methyl isobutyl ketone, methyl t-butyl ketone, diisobutyl ketone, cyclopentanone and cyclohexanone.

In accordance with the above definition of the radicals $R^1$ and $R^2$, preferred carbonyl compounds are formaldehyde and the aliphatic aldehydes and ketones mentioned, especially aldehydes, eg. isobutyraldehyde. If exclusively or predominantly primary and/or secondary amino-$\beta$-hydroxy groups of component (A) are to be reacted, the reaction with aldehydes is preferred. If in addition to secondary amino-$\beta$-hydroxy groups the primary amino groups of the epoxide/diamine adducts, already discussed, are present in significant proportions, the combined reaction with (a) a ketone and subsequently (b) an aldehyde proves very suitable. The reaction (a) with a ketone, to form the ketimine, in general takes place with high specificity but the further reaction of the secondary $\beta$-hydroxyalkyl groups to give the corresponding oxazolidines is better carried out with an aldehyde, for example isobutyraldehyde. This also applies, for example, to epoxide-ammonia adducts if they predominantly contain secondary amino-$\beta$-hydroxyalkyl groups.

(B) The adducts, which may or may not be modified, may be subjected to further treatment by reacting them with partially or completely blocked diisocyanates or polyisocyanates (B). This reaction is advantageously carried out at 40°–150° C., the reaction of completely blocked diisocyanates or polyisocyanates with the primary or secondary amino groups preferably being carried out at 110°–150° C. The reaction of partially blocked diisocyanates or polyisocyanates with the adducts, which may or may not contain ketimine groups and also be modified, is preferably carried out at 10°–100° C. In order to accelerate the formation of urethane groups, the conventional catalysts used for this purpose, for example dibutyl-tin dilaurate, may be employed.

Suitable partially or completely blocked diisocyanates or polyisocyanates are prepared from aliphatic, cycloaliphatic and/or aromatic diisocyanates and polyisocyanates, preferably from toluylene diisocyanate or isophorone diisocyanate, or from derivatives with which partial blocking or semi-blocking proceeds particularly selectively; other aromatic or aliphatic isocyanates may, however, also be used. Particularly suitable polyisocyanates are the reaction products of diisocyanates, eg. toluylene diisocyanate, with polyhydric alcohols, eg. glycols (including oligomeric glycol ether-alcohols), glycerol, trimethylolpropane, dipentaerythritol, pentaerythritol or sorbitol, or their adducts with monoepoxides, eg. ethylene oxide and/or propylene oxide, butylene oxide, glycidol and the like.

Suitable blocking agents are the conventional primary, secondary and tertiary alcohols, eg. n-, iso- and tert.-butanol, 2-ethylhexanol, ethylene glycol monoalkyl ethers, monoalkyl ethers of diglycols or polyglycols and cyclohexanol. However, ketoximes, lactams, imides, imidazole and phenols may also be used as blocking agents.

If phenols are used as blocking agents in the completely blocked diisocyanates or polyisocyanates, these are split off during the reaction with ammonia/epoxide adducts and can subsequently be reacted either with monoepoxides or with formaldehyde or formaldehyde donors.

The precondition for this is, however, that no primary and/or secondary amino groups are present, or if primary amino groups are present, that these groups are protected by ketimine groups against reaction with the epoxide compounds.

When (A) is reacted with (B), where (B) is a completely blocked polyisocyanate prepared from a polyhydric alcohol and diisocyanate, it is true that the blocking agents are in general split off in the desired manner, but splitting of the other urethane group can also occur as a side-reaction, so that transfer of the blocked diisocyanate to the adduct (A) or component (C) takes place.

It can therefore be advantageous to use mixtures of two different blocking agents. The phenol-, alkylphenol- or oxime-blocked isocyanates are particularly reactive and are used as a mixture with one of the above blocking agents. Tert.-butylphenol, for example, is particularly suitable.

The products prepared from the adducts (A), which may or may not be modified, and (B) can be free from basic amino groups or can contain primary and/or secondary and/or tertiary amino groups.

The novel reaction products, containing oxazolidine groups, obtained from (A) and (B) may themselves be employed as electrocoating binders provided the basic nitrogen content and molecular weight of component (A) are carefully chosen and measures are taken to protect substantially all the amino groups. As a guideline, the amine numbers should be from 130 to 400 and the molecular weight from 1,500 to 3,000.

(C) If no basic amino groups are present, it is essential that the further reaction with diamines or polyamines (C) be carried out to give the self-crosslinking cationic binders according to the invention. This subsequent reaction is also indicated for products which contain basic amino groups if, for example, the aim is to obtain binders which are intended to meet specific requirements with regard to the pH and/or conductivity of the coating bath prepared therefrom, or are intended to have a particularly advantageous effect, by reason of their content of primary and/or secondary amino groups or of the basicity of these groups, on the desired crosslinking reaction with the blocked urethane groups.

If adducts obtained from ammonia and diphenol- or polyphenol-based epoxide compounds and not subsequently modified have been employed as component (A), examples of particularly preferred compounds to be employed as component (C) are polyaminoamides and polyaminoimidazolines.

Suitable polyamines (C) are, in general, amines with from 2 to 20, preferably from 3 to 10, primary and/or secondary amino groups per molecule. The amino groups can be part of an aliphatic and/or cycloaliphatic molecule. In addition to these characteristic groupings, the polyamines can also carry other groupings which are important for specific product characteristics, for example OH, —CH=CH—,

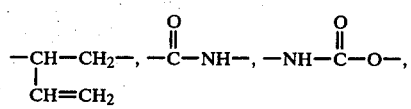

—O—, —N—, unsaturated fatty acid radicals bonded via amide groups or imidazoline radicals, or dimeric fatty acid radicals. Reaction products of glycidyl ethers of the above alkylphenols with polyalkylenepolyamines are also suitable.

Specific examples of polyalkylenediamines and polyamines which may be used as the polyamine (C) are diethylenetriamine, dipropylenetriamine, N,N'-bis-(3-amino-propyl)-ethylenediamine, bis-(6-aminohexyl)-amine, tripropylenetetramine, tetrapropylenepentamine, pentaethylenehexamine, hexamethyleneheptamine, 4,4'-diaminodicyclohexylamine and the like.

Further suitable polyamines are hydrogenated butadiene/acrylonitrile copolymers. Polyethyleneimines and polypropyleneimines and also polyaminoamides and polyaminoimidazolines of saturated or ethylenically unsaturated (dimeric) fatty acids and di- or tri-carboxylic acids may also be used.

Dialkylaminoalkylamines, eg. dimethylaminopropylamine, should also be mentioned; these are preferably used where the binders, referred to above, possessing ketimine groups and obtained from (A) and (B) are concerned. Because of the possibility, which has already been mentioned, of transfer of the blocked isocyanates to amino compounds, polyamines which have 3 or more primary and/or secondary amino groups, and which may or may not be in the form of their ketimines, are desirable in order to obtain the self-crosslinking binders according to the invention by reacting the component (B) with the polyamine (C).

The preparation of the self-crosslinking binders by reacting components (A), (B) and (C) is in general carried out at from 50° to 150° C., preferably at from 100° to 130° C. During the reaction of the amino groups with the blocked isocyanate groups, with the formation of urea bridges, the blocking agent is split off and remains as a solvent in the reaction mixture or is removed if its volatility permits or if the reaction is carried out under reduced pressure; this measure is completely feasible and gives solvent-free reaction products. The crosslinking reaction proceeds at a satisfactory rate at from 160° to 200° C., preferably from 170° to b 180° C. The reaction for the preparation of the binders from components (A), (B) and (C) can additionally be kept separate from the crosslinking reaction by further technical and chemical measures, for example (a) by lowering the reaction temperature after the desired degree of conversion has been reached, which in most cases can be characterized as the point at which a specific viscosity is obtained, and (b) by protonizing with an acid and diluting with a solvent or water. The measures described under (a) and (b) can be combined.

The self-crosslinking binders according to the invention can be diluted with conventional surface-coating solvents, such as $C_3$–$C_{16}$ alcohols, eg. isopropanol, decanol, n-butanol and iso-butanol, alkylaromatics, eg. toluene, cycloaliphatics, (oligomeric) glycols and glycol ethers or aqueous organic solvent mixtures, and then be applied, with or without pigments, fillers and conventional assistants, to the substrate to be coated, eg. wood, metal, glass or ceramic, by conventional coating methods, eg. spraying, dipping or flooding; they are then dried and cured at above 170° C. The coatings thus obtained are distinguished, for example, by high hardness and solvent resistance.

Preferably, however, the surface-coating binders according to the invention are employed after protonization with acids, eg. phosphoric acid and its derivatives or, preferably, water-soluble carboxylic acids, eg. acetic acid, formic acid or lactic acid. The protonized surface-coating binder can be diluted with water and can be employed by the conventional surface-coating methods referred to above; coatings having very valuable propeties are obtained in this case also.

The protonization hydrolyzes the oxazolidine groups, ie. splits the carbonyl compound off again. Thereafter it is possible to remove the solvents and the carbonyl compounds, especially the aldehydes, eg. isobutyraldehyde, employed as carbonyl compounds, from the reaction mixture, preferably under slightly reduced pressure.

In a particularly preferred process for the preparation of secondary dispersions from the binder according to the invention, the reaction product of components (A) and (B), with or without component (C), is protonized with a carboxylic acid and after addition of water the organic solvent or solvents, and/or the hydrolysis products of the oxazolidine groups, especially aldehydes, eg. isobutyraldehyde etc., which can cause odor nuisance in the coating baths, are removed by distillation as an azetropic mixture with water, whilst simultaneously adding more water.

During conversion to the secondary dispersions, or subsequently thereto, the conventional surface-coating solvents, such as $C_3$–$C_{16}$ alcohols, eg. isopropanol, decanol, n-butanol and iso-butanol, alkylaromatics, eg. toluene, and cycloaliphatics as well as (oligomeric) glycols and glycol ethers may be added to the novel binders.

The preferred use of the protonized surfacecoating binders according to the invention is the cathodic electrocoating of electrically conductive surfaces, for example of metal articles, sheets and the like made from brass, copper, aluminum, iron and steel, which may or may not have been chemically pre-treated, eg. phosphatized.

The aqueous cathodic coating dispersions can be prepared by using a mixture of the products of components (A) and (B) with the products of components (A), (B) and (C). The amount added depends on the degree to which the mixture can be protonized.

The aqueous solutions or dispersions of the surface-coating binders, which are, at least partially, in the form of a salt of a water-soluble carboxylic acid, may also contain assistants which, when mixed with the above, can be electrochemically deposited by cataphoresis, eg. pigments, soluble dyes, solvents, flow improvers, stabilizers, anti-foam agents and also other assistants and additives, such as curing catalysts, eg. acetates; or naphthenates or oleates of tin, lead, zinc, zirconium, cobalt, nickel or copper, which are known from the prior art and are disclosed, for example, in German Laid-Open Applications DOS No. 2,541,234 and DOS No. 2,457,437.

The surface-coating binders according to the invention may be employed both as the principal base resin for electrocoating or as the milling resin for the pigment paste. The Cardanol- and fatty acid-modified binders and also the sorbitol/propylene oxide-modified binders obtained by the process of preparation are particularly suitable for this purpose. Alternatively, the resin can be used as the principal base resin for the electrocoating composition, in combination with a conventional pigment paste (eg. as described in German Laid-Open Application DOS No. 2,606,831).

For cathodic electrocoating, the solids content of the electrocoating bath is in general brought to from 5 to 30 percent by weight by dilution with demineralized water. The coating is in general carried out at from 15° to 40° C. for from 1 to 2 minutes at a pH of from 5.0 to 8.5, preferably from 6.0 to 7.5, at from 50 to 500 volt.

After rinsing off residual adhering bath liquor, the film which has been cathodically deposited on the electrically conductive article is cured for from 10 to 30 minutes at from about 160° to 220° C., preferably for 20 minutes at from 170° to 180° C.

The coating agents according to the invention, when cathodically deposited, give coatings with excellent mechanical properties, such as great hardness and scratch resistance, coupled with very good resilience and firm adhesion to the substrate.

Furthermore, the coatings obtained therewith are distinguished by high solvent resistance and corrosion resistance, eg. in a salt spray test.

In the Examples, parts and percentages are by weight, unless stated otherwise.

Preparation of the epoxide/ammonia adducts

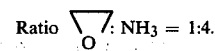

I 480.0 parts of methanol and 109 parts of ammonia are introduced into a pressure reactor. 1,333.0 parts of a 60% strength solution, in toluene, of a diglycidyl ether obtained from bisphenol A and epichlorohydrin and having an epoxide value of 0.2 are introduced, over 60 minutes, by means of a metering pump.

The mixture subsequently reacts for 4 hours at 70° C. The maximum pressure during the reaction is 4 bar. After removing the solvent the excess $NH_3$, ultimately at 150° C. under a reduced pressure of 30 mm Hg, a clear, pale resin having the following data is obtained:

Mean molecular weight 1,650; softening point: 91° C. The total nitrogen content is 1.9%. Of this, 1.1% are attributable to primary, 0.7% to secondary and 0.1% to tertiary amino groups.

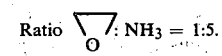

II

As described under I, 1,300 parts of a 60% strength solution, in toluene, of a diglycidyl ether based on bisphenol A and epichlorohydrin and having an epoxide value of 0.2 are pumped into 468.0 parts of methanol and 133.0 parts of ammonia at 60° C. in the reactor.

The data for the clear, pale solid resin are as follows:

Mean molecular weight: about 1,600; softening point: 91° C. The total nitrogen content is 2.1%. Of this, 1.6% is attributable to primary, 0.4% to secondary and 0.1% to tertiary amino groups.

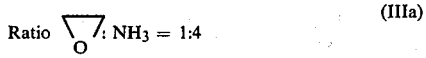   (IIIa)

813.0 parts of methanol and 184.0 parts of ammonia are introduced into a pressure reactor. 902 parts of a solution, in toluene, of a diglycidyl ether of bisphenol A and epichlorohydrin and having an epoxide value of 0.5 are introduced, over 45 minutes, at 60° C., by means of a metering pump. The subsequent reaction is effected by heating the mixture at 70° C. for 4 hours. The maximum pressure during the reaction is 8 bar. The solvent and $NH_3$ are then removed by distillation, ultimately at 150° C. and 30 mm Hg. The clear, pale resin is found to have a mean molecular weight of 2,300 and a softening point of 86° C.

The total nitrogen content is 4.8%. Of this, 2.9% are attributable to primary, 1.7% to secondary and 0.2% to tertiary amino groups.

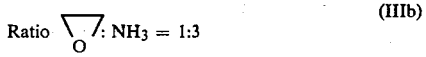   (IIIb)

If the reaction is carried out as described under (a), but using 138.0 parts of ammonia, a product having the following data is obtained:

Mean molecular weight 2,450; Kofler softening point: 89° C. The total nitrogen content is 4.8%. Of this, 2.6% are attributable to primary, 1.9% to secondary and 0.3% to tertiary amino groups.

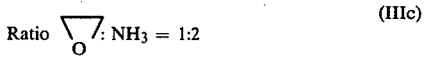   (IIIc)

If the reaction is carried out as described under (a) but using 92.0 parts of ammonia, a product having the following data is obtained:

Mean molecular weight 2,900; softening point: 100° C. The total nitrogen content is 4.2%. Of this, 1.6% are attributable to primary, 2.1% to secondary and 0.5% to tertiary amino groups.

Modification of an epoxide/ammonia adduct 300.0 parts of the epoxide/ammonia adduct obtained as described in III(c) and 40.0 parts of butylglycol are heated at 155°–160° C. 63.0 parts of linseed oil are added dropwise in the course of 1.5 hours, under $N_2$. After having reacted for about 3 hours at 160° C., the initially cloudy mixture becomes clear. The reaction is complete when the viscosity becomes constant, which requires about 3 more hours. The amine number of the batch is 73.5 mg of KOH/g. The batch is diluted to 70% solids content with isopropanol in an apparatus equipped with an efficient stirrer. 35.0 parts of propylene oxide are added dropwise in the course of 45 minutes at 70° C. The reaction is complete when the gentle reflux has ceased.

Preparation of completely blocked polyvisocyanates (B 1) 550.0 parts of an adduct of sorbitol and propylene oxide, obtained by cationic catalysis and having a OH number of 263.4 (molecular weight: 1,270), 340.0 parts of toluene and 0.4 part of dibutyl-tin dilaurate are heated at 90° C. At this temperature, a mixture of 289.0 parts of toluylene diisocyanate (80/20) semi-blocked with ethylglycol, and 520.0 parts of a toluylene diisocyanate semi-blocked with 2-ethylhexanol, is added dropwise in the course of 1.5 hours, and the reaction is continued at 100° C. until a NCO content of 0.02% is obtained. The solids content is 80.2%.

(B 2) 975 parts of an adduct of sorbitol and propylene oxide, obtained as described above by cationic catalysis and having a OH number of 333 (molecular weight: 1,011), 640.0 parts of toluene and 0.8 part of dibutyl-tin-dilaurate are heated to 90° C. At this temperature, a mixture of 577 parts of toluylene diisocyanate (80/20 isomer mixture), semi-blocked with ethylglycol, and 1,160 parts of a toluylene diisocyanate (80/20) semi-blocked with 2-ethylhexanol is added dropwise in the course of 1.5 hours. The mixture is then further heated at 100° C. and reacted until a NCO content of 0.04% is obtained. The solids content is 81.9%.

EXAMPLE 1

450.0 parts of the completely blocked polyisocyanate (B-2) and 240.0 parts of the epoxide/ammonia adduct (II), which has an amine number of 79 and a molecular weight of about 1,600, are heated at 140° C. under nitrogen and the reaction mixture is kept at this temperature until an amine number of about 0 is obtained. 47.5 parts of tetrapropylenepentamine and 10 parts of isodecanol are then added. During the reaction which now starts, the temperature is slowly lowered to 120° C. As soon as the amine number has reached 44.5 mg of KOH/g, the batch is protonized with 15.0 parts of acetic acid in 60.0 parts of water and then diluted with 22.0 parts of isodecanol and 1,100 parts of completely demineralized water to a solids content of 33%.

EXAMPLE 2

269.0 parts of the binder described in Example 1 are mixed with 96.0 parts of a pigment formulation, consisting of 120.0 parts of the binder dispersion, obtained as described in Example 1, in 220.0 parts of $H_2O$, 68.0 parts of talc, 36 parts of titanium dioxide and 16.4 parts of carbon black having a particle size of 3 μm, together with 1.0 part of dibutyl-tin dilaurate and 5 ml of isodecanol, and the mixture is diluted to 1 liter, corresponding to a bath solids content of 12%.

The pH is 7.3; the conductivity is $0.76 \times 10^{-3}$ s.cm$^{-1}$.

Zinc-phosphatized steel panels are coated with the mixture at 25° C. and 200 volt for 2 minutes. After baking for 20 minutes at 190° C., smooth coatings having a thickness of 15–16 μm are obtained. After a salt spray test according to DIN 50,021 for 10 days, a penetration of 1–2 mm (measured from the cut) is found on the zinc-phosphatized steel panels which have been after-treated with chromic acid (Bonder ® 101), and a penetration of 3.5–4.5 mm (measured from the cut) is found in the case of the metal panels after-treated with water only (Bonder 101 WL).

EXAMPLE 3

220.0 parts of the sorbitol/propylene oxide adduct (B 1), containing completely blocked polyisocyanate groups, are heated with 180.0 parts of the epoxide/ammonia adduct (I), which has an amine number of 68 mg of KOH/g of solid resin, at 130° C. under nitrogen and the mixture is kept at this temperature until an amine number of 2 mg of KOH/g of resin solution is obtained. 29.0 parts of tetrapropylenepentamine and 20.0 parts of toluene are then added and heating is continued at 115°–117° C. until an amine number of 40 mg of KOH/g of resin solution is obtained. The resin is then protonized with 9.8 parts of acetic acid in 50 parts of completely demineralized water and diluted slowly with a further 990.0 parts of completely demineralized water. The solids content of the colloidal dispersion is 23.6%.

Electrocoating: 800.0 parts of the above dispersion and 1.0 part of dibutyl-tin dilaurate are diluted with 192.0 parts of completely demineralized water to 1 liter and aged overnight at 30° C. The pH is 7.3 and the conductivity $1.68 \times 10^{-3}$ s.cm$^{-1}$. Cells with internal dimensions of 25 cm×5 cm are used to test the throwing power. The distance of the test panel from the opposite wall is 1, 2 or 3 mm.

When the panels are immersed to a depth of 24 cm, the depth of penetration of the coating, applied at 200 V and 30° C. for 2 minutes, is found to be 24 cm, when the distance is 3 mm; this means that the quotient Q is 1.0. When the distance is 2 mm, a depth of penetration of 19.6 cm (Q=0.9) is found.

When the distance is 1 mm, a depth of penetration of 14.2 cm (Q=0.66) is found.

EXAMPLE 4

(a) Reaction of epoxy resin with ammonia

To prepare an epoxide/NH$_3$ adduct in a stirred pressure vessel, 450 parts of methanol are first introduced, 298 parts of ammonia (NH$_3$) are forced in and a mixture of 1,120 parts of a 60% strength solution, in toluene, of a diglycidyl ether of bisphenol A and epichlorohydrin, having an epoxide value of 0.2 and 168 parts of 4-vinyl-cyclohexene dioxide (ERL 4206 from UCC) are added over 2 hours, at 60° C. The mixture is then allowed to react for 4 hours at 70° C. Thereafter the solvent is completely removed by distillation under reduced pressure, the final temperature being about 150° C. Analysis of the product indicates a total N content of 4.6%, of which 2.3% is attributable to primary N groups, 1.9% to secondary N groups and 0.4% to tertiary N groups. Molecular weight: 1,950.

(b) Preparation of the polymeric oxazolidine 400 parts of the epoxide/NH$_3$ adduct prepared as described in (a), 400 parts of methyl isobutyl ketone and 50 parts of toluene are heated to 120° C., at which the mixture refluxes, and are stirred for 6 hours under reflux whilst removing water. 120 parts of isobutyraldehyde are then run in over 2 hours, under reflux. After this addition has been completed, water is removed from the system for a further 9 hours. The total amount of H$_2$O is 46.5 parts; the solids content of the product is 75.4%.

(c) Preparation of the semi-blocked toluylene diisocyanate 360 parts of ethylglycol are added dropwise over 1 hour to 696 parts of 80/20 toluylene diisocyanate at 15°–20° C. The reaction is allowed to continue for 4 hours at 15°–20° C.

(d) Preparation of a cathodic electrocoating dispersion 271.7 parts of the oxazolidine (B) are heated to 60° C. under a stream of N$_2$, and 90 parts of semi-blocked TDI (c) are added dropwise over 40 minutes at 60° C. The product is allowed to continue to react at 60° C. until the isocyanate content is zero. The reaction is then stopped by adding 8 parts of glacial acetic acid, 20 parts of fully demineralized water and 60 parts of isopropanol. The product is then dispersed in 390 parts of water. Solids content: 28.2%.

(e) Electrocoating

To prepare a 10% strength coating bath, 354.6 parts of the 28.2% strength dispersion (d) are diluted to 1,000 parts with fully demineralized water. 500 ppm of lead (based on volume of the bath) are then added as an aqueous lead acetate solution. The bath is stirred for 24 hours at 30° C.; it has a pH of 5 and a conductivity of $1.0 \times 10^{-3}$ S.cm$^{-1}$. Phosphatized steel panels are coated in the bath for 2 minutes at 200 V and 30° C. and the coating is then cured for 20 minutes at 180° C. for 20 minutes at 170° C., giving a smooth coating 16 μm thick.

The DIN 50,021 corrosion test, carried out on iron-phosphatized steel panels which had been rinsed with chromic acid (Bonder ® 1041) showed, after 10 days, a penetration of 1.5–2 mm in the case of coating films which had been cured for 20 minutes at 180° C., whilst the result was 1.7–3 mm if the films had been cured for 20 minutes at 170° C., the penetration in each case being measured from the cut.

If a 10% strength coating bath without added lead is employed, and phosphatized steel panels are coated for 2 minutes at 200 V and 30° C., followed by curing for 20 minutes at 180° C., a smooth coating 23 μm thick is obtained.

The DIN 50,021 corrosion test on iron-phosphatized steel panels which had been rinsed with chromic acid showed a depth of penetration of 0.5–1 mm (measured from the cut) after 10 days.

EXAMPLE 5

(a) Reaction of epoxy resin with ammonia

To prepare an epoxide/NH$_3$ adduct in a stirred pressure vessel, 480 parts of methanol are first introduced, 83 parts of ammonia (NH$_3$) are forced in and 1,333 parts of a 60% strength solution, in toluene, of a diglycidyl ether of bisphenol A and epichlorohydrin, having an epoxide value of 0.2, are added over 1 hour at 60° C. The mixture is then allowed to react for 4 hours at 70° C. Thereafter the solvent is completely removed by distillation under reduced pressure, the final temperature being 150° C. Analysis of the product indicates a total N content of 2.0%, of which 0.9% is attributable to primary N groups, 1.0% to secondary N groups and 0.1% to tertiary N groups. Molecular weight: 860.

(b) Preparation of the polymeric oxazolidine 400 parts of the product prepared as described in (a) and 400 parts of methyl isobutyl ketone are heated to about 120° C., at which temperature the mixture refluxes. Stirring under reflux is then continued for 6½ hours and during this time 15.4 parts of water are removed from the system. Solids content of the product: 55%.

(c) Preparation of the semi-blocked toluylene diisocyanate 390 parts of ethylhexanol are added dropwise over 1 hour to 522 parts of 80/20 toluylene diisocyanate at 15°–20° C. The reaction is allowed to continue for 4 hours at 15°–20° C.

(d) Preparation of a polyamine 750 parts of a dimeric linseed oil fatty acid (for example Empol ® 1015 from Unilever) and 750 parts of dipropylenetriamine are heated at 190°–200° C. and at this temperature the water is distilled off, through a descending condenser, over 3 hours. The mixture is then distilled under reduced pressure until the internal temperature reaches about 200° C. The residue is then allowed to cool under nitrogen. Final viscosity: 21.2 poise/75° C. (measured by means of a plate-and-cone viscometer).

(e) Preparation of the cathodic electrocoating binder 94.4 parts of semi-blocked toluylene diisocyanate (TDI) (c) are added dropwise over 40 minutes to 320 parts of the oxazolidine (b) at 60°–70° C. The reaction is allowed to continue at 90° C. until the isocyanate content had fallen to zero. After having added 67.5 parts of the polyamine (d), the mixture is heated to 100° C. and stirred at this temperature until the viscosity remains constant. This situation is reached after 1 hour, the viscosity being about 17.6 poise/100° C. (measured by means of a plate-and-cone viscometer). The reaction is then stopped by means of 25 parts of Alfol 1214/4 (a primary $C_{12}$-$C_{14}$-alcohol mixture), 20 parts of fully demineralized water and 6 parts of glacial acetic acid. The solids content of the binder is 71.5%.

(f) Electrocoating

To prepare a 10% strength coating bath, 100 parts of the solid resin (e) are diluted to 1,000 parts with fully demineralized water. The bath is stirred for 24 hours at 30° C.; it has a pH of 6.8 and a conductivity of $0.35 \times 10^{-3}$ S.cm$^{-1}$. Then 10 parts of isodecanol are added. Phosphatized steel panels are coated for 2 minutes at 250 V and 30° C., and cured for 20 minutes at 180° C., giving a smooth coating 14–16 $\mu$m thick.

The DIN 50,021 corrosion test on iron-phosphatized steel panels which had been rinsed with chromic acid (Bonder ® 104) gave a penetration of 1.5–3.5 mm (measured from the cut) after 10 days.

EXAMPLE 6

(a) Reaction of epoxy resin with ammonia

To prepare an epoxide/NH$_3$ adduct in a stirred pressure vessel, 2,400 parts of methanol are first introduced, 750 parts of ammonia (NH$_3$) are forced in and 2,800 parts of a 60% strength solution, in toluene, of a diglycidyl ether of bisphenol A and epichlorohydrin, having an epoxide value of 0.2, are added over 3 hours at 60° C. The mixture is then allowed to react for 1 hour at 60° C. Thereafter the solvent is completely removed by distillation under reduced pressure, the final temperature being 150° C. Analysis of the product indicates a total N content of 4.5%, of which 2.6% is attributable to primary N groups, 1.6% to secondary N groups and 0.3% to tertiary N groups. Molecular weight: 1,430; amine number: 157.

(a$_1$) To prepare an epoxide/NH$_3$ adduct having an amine number of 145, 2,400 parts of methanol are introduced into a stirred pressure vessel, 685 parts of ammonia (NH$_3$) are forced in and 2,800 parts of a 60% strength solution, in toluene, of a diglycidyl ether of bisphenol A and epichlorohydrin, having an epoxide value of 0.2, are added over 3 hours at 60° C. The mixture is then allowed to react for 1 hour at 60° C. Thereafter the solvent is completely removed by distillation under reduced pressure, the final temperature being 150° C. Analysis of the product indicates a total N content of 4.2%, of which 2.1% is attributable to primary N groups, 1.7% to secondary N groups and 0.4% to tertiary N groups. Molecular weight: 970.

(b) Preparation of the polymeric oxazolidine 875 parts of the product prepared as described in (a) and 875 parts of the product prepared as described in (a$_1$) are fused and diluted with 942 parts of toluene. 350 parts of isobutyraldehyde are added dropwise over 1 hour under reflux (about 120° C.). After completion of the addition, water is removed from the system for 2 hours, under reflux (total amount of H$_2$O: 89 parts). 176 parts of glycidol are then added dropwise over 20 minutes at about 120° C., after which the mixture is stirred for a further 8 hours under reflux. Solids content: 72.4%.

(c) Preparation of the semi-blocked toluylene diisocyanate 700 parts of ethylhexanol are added dropwise over 1 hour to 870 parts of 80/20 toluylene diisocyanate at 20° C. The reaction is allowed to continue for 4 hours at 20° C.

(c$_1$) 408.5 parts of methylglycol are added dropwise over 1 hour to 870 parts of 80/20 toluylene diisocyanate at 20° C. The reaction is allowed to continue for 4 hours at 20° C.

(d) Preparation of a polyamine 580 parts of a dimeric linseed oil fatty acid (eg. Empol 1015) and 490 parts of tetrapropylenepentamine are heated at 190° C., and the water is distilled off over 2 hours at the same temperature, via a descending condenser. The residue is then allowed to cool under nitrogen. The amine number of the product is 354.

(e) Preparation of a cathodic electrocoating dispersion 276 parts of the product prepared under (b), 0.4 part of dibutyl-tin dilaurate and 55 parts of toluene are heated at 30°–40° C. and a mixture of 76 parts of the semi-blocked TDI (c) and 33 parts of the semi-blocked TDI (c$_1$) is added dropwise over 1 hour at 30°–40° C. After the mixture has been stirred for 1½ hours at 60° C., 80 parts of polyamine (d) are added. After this addition, the mixture is stirred at 100°–110° C. until the amine number has reached 30. The reaction is at that stage stopped by means of 8.5 parts of glacial acetic acid and stopped by means of 8.5 parts of glacial acetic acid and 60 parts of fully demineralized water. The solvent is distilled off demineralized water. The solvent is distilled off under reduced pressure at 60° C. and at the same time 500 parts of fully demineralized water are added dropwise. The solids content of the product is 38.6%.

(f) Electrocoating

To prepare a 10% strength coating bath, 7.7 parts of ethylhexanol, 7.7 parts of isopropanol and 340 ppm of lead (based on volume of the bath), in the form of an aqueous lead acetate solution, are stirred into 259 parts of the 38.6% strength dispersion (e). The mixture is then diluted to 1,000 parts with fully demineralized water. The bath is stirred for 24 hours at 30° C.; it has a pH of 7.2 and a conductivity of $1.85 \times 10^{-3}$ S.cm$^{-1}$. Then 5 parts of isodecanol are added. Phosphatized steel panels are coated for 2 minutes at 190 V and 30° C. and cured for 20 minutes at 180° C., giving a 16 $\mu$m thick coating.

The DIN 50,021 corrosion test on iron-phosphatized steel panels which have been rinsed with chromic acid showed a penetration of up to 0.5 mm after 10 days, whilst on iron-phosphatized steel panels which had been rinsed with water and air-dried (Bonder 1041 WL) the penetration was up to 0.9 mm (in each case measured from the cut). Zinc-phosphatized steel panels which had been rinsed with chromic acid (Bonder 101) showed a penetration of 0.5–1.5 mm after 10 days, whilst zinc-phosphatized steel panels which had been rinsed with water and air-dried (Bonder 101 WL)

showed up to 0.7 mm penetration (in each case measured from the cut).

To test the throwing power, cells of internal dimensions 25 cm×5 cm were used. The test panels were at a distance of 3 mm or 2 mm from the opposite wall or counter-electrode. For a depth of immersion of 21.7 cm, and a 3 mm distance, the depth of penetration of the coating (applied for 2 minutes at 200 V and 30° C.) was found to be 21.7 cm; this means that the quotient Q was 1.0. For a spacing of 2 mm, the depth of penetration was found to be 18.7 cm (Q=0.86).

EXAMPLE 7

(a) Reaction of epoxy resin with ethylenediamine 240 parts of ethylenediamine are heated to 70° C. and 1,393 parts of a 70% strength solution, in toluene, of a diglycidyl ether of bisphenol A and epichlorohydrin, having an epoxide value of 0.2, are added dropwise over 2 hours at 70° C. After the completion of this addition, the solvent is completely distilled off under reduced pressure (final temperature during distillation about 150° C.). The analysis gives a total N content of 4.4%, of which 1.8% is attributable to primary N groups, 2.5% to secondary N groups and 0.1% to tertiary N groups. Molecular weight: 1,430.

(b) Preparation of the polymeric oxazolidine 300 parts of the product prepared as described in (a), 128.6 parts of toluene and 53 parts of methyl isobutyl ketone are heated at about 120°–130° C. (at which temperature the mixture refluxes), and stirred under reflux for 5 hours.

During this period, water is removed from the system. 80 parts of toluene are then added and 40 parts of solvent are removed from the water separator unit. 55 parts of isobutyraldehyde are then run in, under reflux, over 1½ hours. Thereafter, the removal of water is continued for 3 hours, following which a further 160 parts of solvent are removed (total amount of $H_2O$: 38.4 parts). The solids content of the product is 77.5%.

(c) Preparation of the semi-blocked toluylene diisocyanate 360 parts of ethylglycol are added dropwise over 1 hour to 696 parts of 80/20 toluylene diisocyanate at 15°–20° C. The mixture is then allowed to react for a further 4 hours at the same temperature.

(d) Preparation of a polyamine 1,000 parts of a dimeric linseed oil fatty acid (for example Empol 1014) and 700 parts of dipropylenetriamine are heated to 190°–200° C., and the water is distilled off over 3 hours at this temperature. The mixture is then distilled under reduced pressure until the internal temperature reaches about 200° C. The residue is then cooled under nitrogen.

(e) Preparation of a cathodic electrocoating dispersion 170 parts of the oxazolidine (b) are heated to 60° C. under a stream of $N_2$ and 56.5 parts of semi-blocked TDI (c) are added dropwise over 40 minutes at 60° C. The product is allowed to react for a further 45 minutes at 60° C. and 30 parts of the polyamine (d) are then added. Stirring is then continued, at 90° C., until the amine number had reached 20. The reaction is then stopped by means of 6 parts of glacial acetic acid, 44.5 parts of fully demineralized water and 40 parts of butylglycol. The solvent is distilled off under reduced pressure at 60° C. At the same time, 500 parts of fully demineralized water are added dropwise. The solids content of the dispersion of 23.3%.

(f) Electrocoating

To prepare a 10% strength coating bath, 428.2 parts of the 23.3% strength dispersion (e), 0.5 part of glacial acetic acid and 500 ppm of lead (based on volume of the bath), in the form of an aqueous lead acetate solution, are diluted to 1,000 parts with fully demineralized water. 25 parts of butylglycol and 5 parts of isodecanol are then added. The coating bath is stirred for 24 hours at 30° C. Phosphatized steel panels are coated for 2 minutes at 150 V and 30° C. and cured for 20 minutes at 170° C., giving a smooth coating 12 μm thick.

The DIN 50,021 corrosion test on iron-phosphatized steel panels which had been rinsed with chromic acid (Bonder 104) gave a penetration of 2.5–3.5 mm (measured from the cut) after 10 days.

EXAMPLE 8

(a) Reaction of epoxy resin with ethylenediamine 240 parts of ethylenediamine are heated to 70° C. and 1,393 parts of a 70% strength solution, in toluene, of a diglycidyl ether of bisphenol A and epichlorohydrin, having an epoxide value of 0.2, are added dropwise over 2 hours at 70° C. After completion of this addition, the solvent is completely distilled off under reduced pressure (final temperature during distillation about 150° C.). The analysis gives a total N content of 4.4%, of which 1.8% is attributable to primary N groups, 2.5% to secondary N groups and 0.1% to tertiary N groups. Molecular weight: 1,430.

(b) Preparation of the polymeric oxazolidine 300 parts of the product prepared as described in (a), 128.6 parts of toluene and 53 parts of methyl isobutyl ketone are heated to about 120°–130° C. (at which temperature the mixture refluxes), and are stirred for 5 hours under reflux. During this time, water is removed from the system. 80 parts of toluene are then added and about 40 parts of solvent are removed from the water separator unit. 55 parts of isobutyraldehyde are then run in over 1½ hours, under reflux. After completion of this addition, water is removed for a further 3 hours and a further 60 parts of solvent are then removed (total amount of $H_2O$: 38.4 parts). The solids content of the oxazolidine is 77.5%.

(c) Preparation of the semi-blocked toluylene diisocyanate 360 parts of ethylglycol are added dropwise over 1 hour to 696 parts of 80/20 toluylene diisocyanate at 15°–20° C. The mixture is then allowed to react for a further 4 hours at the same temperature.

(d) Preparation of a polyamine 1,000 parts of a dimeric linseed oil fatty acid (for example Empol 1014) and 700 parts of dipropylenetriamine are heated at 190°–200° C., and the water is distilled off over 3 hours at the same temperature. The mixture is then distilled under reduced pressure until the internal temperature has reached about 200° C. The residue is allowed to cool under nitrogen.

(e) Preparation of a cathodic electrocoating dispersion 258 parts of the oxazolidine (b) and 42.2 parts of toluene are heated to 60° C. under a stream of $N_2$ and 107.7 parts of semi-blocked TDI (c) are added dropwise over 40 minutes at 60° C. The product is allowed to react for a further 45 minutes at 60° C., after which 46.2 parts of the polyamine (d) are added. The mixture is then stirred at 90° C. until the amine number has reached 13. At this stage, the reaction is stopped by means of 7.7 parts of glacial acetic acid and 22.3 parts of fully demineralized water. The solvent is then distilled off under reduced pressure at 60° C. At the same time, 130 parts of fully demineralized water are added dropwise. The solids content of the dispersion obtained is 41.3%.

(f) Electrocoating

To prepare a 10% strength coating bath, 242 parts of the 41.3% strength dispersion (e), 5 parts of butylglycol and 5 parts of isodecanol are diluted to 1,000 parts with fully demineralized water. The coating bath is stirred for 48 hours at room temperature (about 23° C.); it has a pH of 6.9 and a conductivity of $0.8 \times 10^{-3}$ S.cm$^{-1}$. After stirring the bath for 48 hours, 15 parts of butyglycol are added. Phosphatized steel panels are coated for 2 minutes at 100 V and room temperature, and curing for 20 minutes at 180° C. gives a smooth coating 13–15 μm thick.

The DIN 50,021 corrosion test on iron-phosphatized steel panels which had been rinsed with chromic acid showed a penetration of 0.8–3 mm (measured from the cut) after 10 days.

EXAMPLE 9

(a) Reaction of epoxy resin with ethylenediamine 180 parts of ethylenediamine are heated to 70° C. and 1,393 parts of a 70% strength solution, in toluene, of a diglycidyl ether of bisphenol A and epichlorohydrin, having an epoxide value of 0.2, are added dropwise over 2 hours at 70° C. After completion of the addition, the solvent is completely distilled off under reduced pressure (final temperature during distillation about 150° C.). The analysis gives a total N content of 4.1%, of which 1.5% is attributable to primary N groups, 2.4% to secondary N groups and 0.2% to tertiary N groups. Molecular weight: 1,650.

(b) Preparation of the polymeric oxazolidine 500 parts of the product prepared as described in (a), 81.4 parts of linseed oil fatty acid (for example Nouracid ® LE 80) and 0.05 part of hydroquinone are heated to 180° C. under a stream of N$_2$ and are stirred at this temperature for 5 hours. During this time, the water of reaction is distilled off. The mixture is then cooled to 120°–130° C. and 400 parts of toluene and 40 parts of methyl isobutyl ketone are added dropwise over 1 hour. The mixture is then stirred for 3 hours at 120°–130° C., during which time water is removed from the system. Thereafter about 120 parts of solvent are removed from the water separator unit and replaced by 100 parts of toluene. 60 parts of isobutyraldehyde are then run in over 1½ parts at about 120° C. (at which temperature the mixture refluxes). After completion of the addition, water is removed for a further 5 hours, and a further 100 parts of solvent are removed (total amount of H$_2$O: 53 parts). The solids content of the product is 86.6%.

(c) Preparation of the semi-blocked toluylene diisocyanate 360 parts of ethylene glycol are added dropwise over 1 hour to 696 parts of 80/20 toluylene diisocyanate at 15°–20° C. The mixture is then allowed to react for a further 4 hours at the same temperature.

(d) Preparation of the cathodic electrocoating dispersion 300.3 parts of the oxazolidine (b) are heated to 60° C. under a stream of N$_2$ and 85.7 parts of semi-blocked TDI (c) are added dropwise over 40 minutes at the same temperature. The product is then left to react for a further 45 minutes at 60° C., after which 18.2 parts of tetrapropylenepentamine are added. Stirring is then continued, at 90° C., until the amine number has reached 11. The reaction is then stopped by means of 7.6 parts of glacial acetic acid and 22.4 parts of fully demineralized water. The solvent is distilled off under reduced pressure at 60° C. At the same time, 400 parts of fully demineralized water are added dropwise. A further 60 parts of isopropanol are then added. The solids content of the resulting dispersion is 34.9%.

(e) Electrocoating

To prepare a 10% strength coating bath, 286.5 parts of the 34.9% strength dispersion (d) and 5 parts of butylglycol are diluted to 1,000 parts with fully demineralized water. The coating bath is stirred for 24 hours at 30° C.; it has a pH of 7.9 and a conductivity of $1.25 \times 10^{-3}$ S.cm$^{-1}$. Then 15 parts of butylglycol, 5 parts of isodecanol and 0.5 part of glacial acetic acid are added. After stirring further, for 48 hours at room temperature, 15 parts of butylglycol and 5 parts of isodecanol are added.

Phosphatized steel panels are coated for 2 minutes at 150 V and 30° C., and after curing for 20 minutes at 180° C. a coating 8–10 μm thick is obtained.

The DIN 50,021 corrosion test on iron-phosphatized steel panels which have been rinsed with chromic acid showed a penetration of 2.5–4.5 mm (measured from the cut) after 10 days.

COMPARATIVE EXAMPLE 1

(a) Reaction of epoxy resin with ethylenediamine

Following the procedure described in Example 8(a), 240 parts of ethylenediamine are heated to 70° C. and 1,393 parts of a 70% strength solution, in toluene, of a diglycidyl ether of bisphenol A and epichlorohydrin, having an epoxide value of 0.2, are added dropwise over 2 hours at 70° C. After completion of this addition, the solvent is completely distilled off under reduced pressure (final temperature during distillation about 150° C.). The analysis gives a total N content of 4.4%, of which 1.8% is attributable to primary N groups, 2.5% to secondary N groups and 0.1% to tertiary N groups. Molecular weight: 1,430.

(b) Preparation of the semi-blocked toluylene diisocyanate 360 parts of ethylene glycol are added dropwise over 1 hour to 696 parts of 80/20 toluylene diisocyanate at 15°–20° C. The mixture is then allowed to react for a further 4 hours at the same temperature.

(c)

100 parts of the product prepared as described in (a) are fused (at about 125° C.) and diluted with 53.8 parts of toluene. The addition of 66.7 parts of semiblocked TDI (b) is started when the mixture has cooled to 60° C. After 4 parts have been added, the batch is already crosslinked.

COMPARATIVE EXAMPLE 2

(a) Reaction of epoxy resin with ethylenediamine

Following the procedure described in Example 9(a), 180 parts of ethylenediamine are heated to 70° C. and 1,393 parts of a 70% strength solution, in toluene, of a diglycidyl ether of bisphenol A and epichlorohydrin, having an epoxide value of 0.2, are added dropwise over 2 hours at 70° C. After completion of the addition, the solvent is completely distilled off under reduced pressure (final temperature during distillation about 150° C.). The analysis gives a total N content of 4.1%, of which 1.5% is attributable to primary N groups, 2.5% to secondary N groups and 0.2% to tertiary N groups. Molecular weight: 1,650.

(b) Preparation of the semi-blocked toluylene diisocyanate 360 parts of ethylglycol are added dropwise over 1 hour to 696 parts of 80/20 toluylene diisocyanate at 15°–20° C. The mixture is then allowed to react for a further 4 hours at the same temperature.

(c)

180 parts of the product prepared as described in (a), 29.3 parts of linseed oil fatty acid (for example Nouracid LE 80) and 0.020 part of hydroquinone are heated to 180° C., and the water is distilled off at that temperature over 5 hours. The batch is then cooled and diluted with 113 parts of toluene. After dilution, the addition of 139.5 parts of semi-blocked TDI (b) is started when the mixture has cooled to 60° C. After 28.3 parts have been added, the mixture is already crosslinked.

We claim:

1. A self-crosslinking binder, based on adducts of ammonia and epoxide compounds, for the cathodic electrocoating of metallically conductive articles, which binder has been obtained by reacting (A) an adduct of ammonia and epoxide compounds of the general formulae $$R-E^1-[NH-E^1]_{\overline{n1}}R, \quad (I)$$

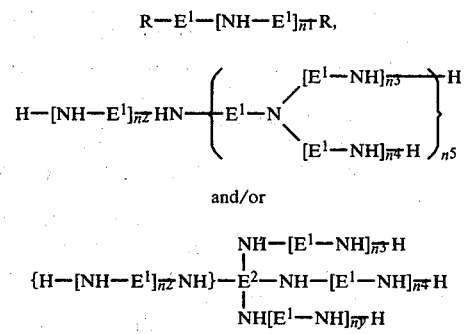 (II)

and/or $$\{H-[NH-E^1]_{\overline{n2}}NH\}-E^2\underset{\underset{NH[E^1-NH]_{\overline{n7}}H}{|}}{\overset{\overset{NH-[E^1-NH]_{\overline{n3}}H}{|}}{-}}NH-[E^1-NH]_{\overline{n4}}H \quad (III)$$

where R is S-alkyl of 1 to 12 carbon atoms, or phenoxy or alkylphenoxy where alkyl is of 1 to 18 carbon atoms, the $E^1$'s are identical or different hydroxyl-containing divalent radicals and the $E^2$'s are identical or different hydroxyl-containing trivalent or tetravalent radicals, resulting from the opening of the oxirane rings of epoxide compounds containing two, three or four epoxide groups in the molecule, an $n^1$ is from 1 to 5, $n^2$, $n^3$, $n^4$ and $n^6$ are from 0 to 3 and $n^5$ is from 1 to 3, with (B) partially or completely blocked diisocyanates or polyisocyanates, with or without (C) diamines or polyamines and subsequently protonizing the reaction product with an acid, with the proviso that for the preparation of component (A) the epoxide compounds are reacted with ammonia in such relative proportions that there are 1.75 to 10 moles of ammonia per epoxide group and the reaction product of (A) and (B) or of (A), (B) and (C) has an amine number of from 10 to 150 mg of KOH/g of solid product.

2. The self-crosslinking binder of claim 1, wherein some of the primary and/or secondary amino groups of the adduct of ammonia and epoxide compounds have been converted to amide groups by reaction with saturated or ethylenically unsaturated carboxylic acids or carboxylic acid esters where acyl is of 6 to 24 carbon atoms.

3. The self-crosslinking binder of claim 1, wherein some of the primary and/or secondary amino groups of the adduct of ammonia and epoxide compounds have been reacted with monoglycidyl ethers of saturated or olefinically unsaturated alkylphenols where alkyl is of 6 to 18 carbon atoms, or with monoglycidyl esters of saturated or olefinically unsaturated, linear or branched, carboxylic acids, where acyl is of 6 to 24 carbon atoms.

4. The self-crosslinking binder of claim 1, wherein the amino groups of the adduct of ammonia and an epoxide compound have been converted, prior to the reaction, to ketimine or oxazolidine groups by reaction with partially blocked or completely blocked diisocyanates or polyisocyanates.

5. The self-crosslinking binder of claim 1, wherein the diamine or polyamine (C) has from 2 to 20 primary and/or secondary amino groups.

6. The self-crosslinking binder of claim 1, wherein the reaction product of (A) and (B) or of (A), (B) and (C) has an amine number of from 10 to 150 mg of KOH/g of solids.

7. The self-crosslinking binder of claim 1, wherein the reaction product of (A) and (B) or of (A), (B) and (C) has an amine number of from 25 to 75 mg of KOH/g of solids.

8. The self-crosslinking binder of claim 1, wherein all the primary and/or secondary amino groups of the adducts of ammonia and epoxide compounds have been converted to urea groupings by reaction with partially blocked or completely blocked diisocyanates or polyisocyanates.

9. The self-crosslinking binder of claim 1, wherein the self-crosslinking binder obtained from (A), (B) and (C) is employed in combination with a reaction product of (A) and (B).

10. The self-crosslinking cationic binder of claim 4, which has been obtained by reacting (A) an adduct of ammonia and epoxide compounds, which contains primary and/or secondary amino-β-hydroxyalkyl groups and have molecular weights of from 300 to 5,000, with (b) semi-blocked or partially blocked diisocyanates or polyisocyanates, with or without (C) diamines or polyamines and protonization of the reaction product with an acid, wherein the primary and/or secondary amino-β-hydroxyalkyl groups of component (A) have, prior to the reaction with component (B), been reacted, to form an oxazolidine ring, with a carbonyl compound of the general formula (IV)

 (IV)

where $R^1$ and $R^2$ may be identical or different and each is hydrogen, an aliphatic hydrocarbon radical of 1 to 4 carbon atoms, a cycloaliphatic hydrocarbon radical of 5 to 7 carbon atoms or an aromatic hydrocarbon radical of 6 to 10 carbon atoms or $R^1$ and $R^2$, conjointly with the carbon atom of the carbonyl group, are linked to form a 5-membered or 6-membered cycloaliphatic hydrocarbon ring.

11. The binder of claim 7, wherein the component (A), instead of being an adduct of ammonia and an epoxide compound, of the general formula (I), (II) or (III), is an adduct of a diamine and an epoxide compound of the general formula

R—E¹—[NH—R³—NH—E¹]ₙ₁R  (B)

and/or

H₂N'—[R³—NH—E¹—NH]ₙ₁R³—NH₂  (VI)

where R is S-alkyl of 1 to 12 carbon atoms, phenoxy or alkylphenoxy, where alkyl is of 1 to 18 carbon atoms, and R³ is a straight-chain, branched or cyclic divalent hydrocarbon radical of 2 to 16 carbon atoms which may or may not contain NH groups or ether groups, the E¹'s are identical or different hydroxyl-containing divalent radicals, as are obtained by opening the oxirane rings of epoxide compounds having two epoxide groups in the molecule, and n¹ is an integer from 0 to 5.

12. The binder of claim 7, wherein some of the primary and/or secondary amino-β-hydroxyalkyl groups of component (A) have, before reaction with the carbonyl compound (IV), been converted to the corresponding amides with saturated or ethylenically unsaturated fatty acids or dimeric fatty acids.

13. The binder of claim 7, wherein the NH group of the oxazolidine ring, resulting from the reaction of primary amino-β-hydroxyalkyl groups of component (A) with the carbonyl compound (IV), has been reacted with an epoxide compound prior to the reaction with component (B).

14. The binder of claim 7, wherein the epoxide compound used for the reaction of the NH group of the oxazolidine ring, prior to the reaction with component (B), is a monoepoxide compound.

15. The binder of claim 7, wherein the carbonyl compound (IV) is an aldehyde.

16. The binder of claim 8, wherein the primary amino groups of component (A) of the formula (VI) are converted to ketimine groups by means of ketones of the formula (IV), prior to the reaction with compound (B).

17. The self-crosslinking binder of claim 2, wherein the amino groups of the adduct of ammonia and an epoxide compound have been converted, prior to the reaction, to ketimine or oxazolidine groups by reaction with partially blocked or completedly blocked diisocyanates or polyisocyanates.

18. The self-crosslinking binder of claim 3, wherein the amino groups of the adduct of ammonia and an epoxide compound have been converted, prior to the reaction, to ketimine or oxazolidine groups by reaction with partially blocked or completely blocked diisocyanates or polyisocyanates.

19. The self-crosslinking binder of claim 2, wherein all the primary and/or secondary amino groups of the adducts of ammonia and epoxide compounds have been converted to urea groupings by reaction with partially blocked or completely blocked diisocyanates or polyisocyanates.

20. The self-crosslinking binder of claim 3, wherein all the primary and/or secondary amino groups of the adducts of ammonia and epoxide compounds have been converted to urea groupings by reaction with partially blocked or completely blocked diisocyanates or polyisocyanates.

21. The self-crosslinking binder of claim 2, wherein the self-crosslinking binder obtained from (A), (B) and (C) is employed in combination with a reaction product of (A) and (B).

22. The self-crosslinking binder of claim 3, wherein the self-crosslinking binder obtained from (A), (B) and (C) is employed in combination with a reaction product of (A) and (B).

23. The self-crosslinking binder of claim 5, wherein the self-crosslinking binder obtained from (A), (B) and (C) is employed in combination with a reaction product of (A) and (B).

24. The self-crosslinking binder of claim 7, wherein the self-crosslinking binder obtained from (A), (B) and (C) is employed in combination with a reaction product of (A) and (B).

25. The self-crosslinking binder of claim 8, wherein the self-crosslinking binder obtained from (A), (B) and (C) is employed in combination with a reaction product of (A) and (B).

26. The binder of claim 11, wherein some of the primary and/or secondary amine-β-hydroxyalkyl groups of component (A) have, before reaction with the carbonyl compound (IV), been converted to the corresponding amides with saturated or ethylenically unsaturated fatty acids or dimeric fatty acids.

27. The binder of claim 11, wherein the NH group of the oxazolidine ring, resulting from the reaction of primary amino-β-hydroxyalkyl groups of component (A) with the carbonyl compound (IV), has been reacted with an epoxide compound prior to the reaction with component (B).

28. The binder of claim 18, wherein the NH group of the oxazolidine ring, resulting from the reaction of primary amino-β-hydroxyalkyl groups of component (A) with the carbonyl compound (IV), has been reacted with an epoxide compound prior to the reaction with component (B).

29. The binder of claim 11, wherein the epoxide compound used for the reaction of the NH group of the oxazolidine ring, prior to the reaction with component (B), is a monoepoxide compound.

30. The binder of claim 12, wherein the epoxide compound used for the reaction of the NH group of the oxazolidine ring, prior to the reaction with component (B), is a monoepoxide compound.

31. The binder of claim 13, wherein the epoxide compound used for the reaction of the NH group of the oxazolidine ring, prior to the reaction with component (B), is a monoepoxide compound.

32. The binder of claim 11, wherein the carbonyl compound (IV) is an aldehyde.

33. The binder of claim 12, wherein the carbonyl compound (IV) is an aldehyde.

34. The binder of claim 13, wherein the carbonyl compound (IV) is an aldehyde.

35. The binder of claim 14, wherein the carbonyl compound (IV) is an aldehyde.

36. The binder of claim 12, wherein the primary amino groups of component (A) of the formula (VI) are converted to ketimine groups by means of ketones of the formula (IV), prior to the reaction with compound (B).

37. The binder of claim 13, wherein the primary amino groups of component (A) of the formula (VI) are converted to ketimine groups by means of ketones of the formula (IV), prior to the reaction with compound (B).

38. The binder of claim 14, wherein the primary amino groups of component (A) of the formula (VI) are converted to ketimine groups by means of ketones of the formula (IV), prior to the reaction with compound (B).

39. The binder of claim 15, wherein the primary amino groups of component (A) of the formula (VI) are converted to ketimine groups by means of ketones of the formula (IV), prior to the reaction with compound (B).

* * * * *

UNITED STATES PATENT AND TRADEMARK OFFICE
CERTIFICATE OF CORRECTION

PATENT NO. : 4,310,646
DATED : January 12, 1982
INVENTOR(S) : Fritz E. Kempter and Eberhard Schupp It is certified that error appears in the above—identified patent and that said Letters Patent is hereby corrected as shown below:

IN THE CLAIMS:

The third formula of claim 1 should read as follows:

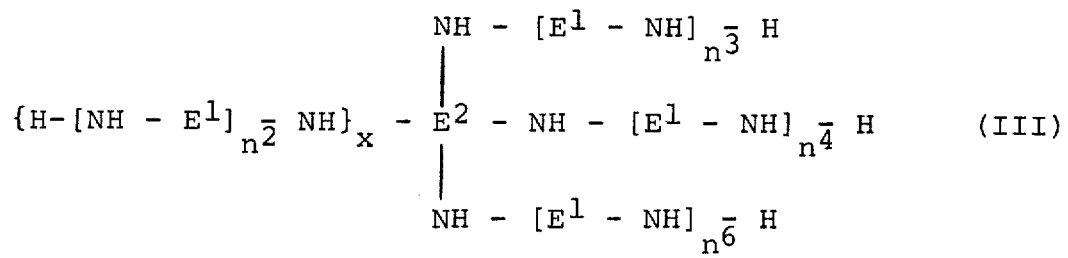

$$\{H-[NH-E^1]_{n_2}NH\}_x - E^2 \begin{array}{c} NH-[E^1-NH]_{n_3}H \\ | \\ | \\ NH-[E^1-NH]_{n_6}H \end{array} - NH-[E^1-NH]_{n_4}H \qquad (III)$$

In line 7 of Claim 10, "(b)" should be --(B)--.

In line 1 of claims 12,13,14 and 15, the claims should be amended to depend on Claim 10 rather than on Claim 7.

UNITED STATES PATENT AND TRADEMARK OFFICE
CERTIFICATE OF CORRECTION

PATENT NO. : 4,310,646
DATED : January 12, 1982
INVENTOR(S) : Fritz E. Kempter and Eberhard Schupp It is certified that error appears in the above—identified patent and that said Letters Patent is hereby corrected as shown below:

IN THE CLAIMS:

In line 1 of Claim 16, "8" should read --11--.

In line 5 of Claim 17, "completedly" should read --completely--.

In line 2 of Claim 26, "amine" should read --amino--.

In line 1 of Claim 28, "18" should read --12--.

Signed and Sealed this

Twenty-second Day of June 1982

[SEAL]

Attest:

Attesting Officer

GERALD J. MOSSINGHOFF

Commissioner of Patents and Trademarks